(12) United States Patent
Di Pietro et al.

(10) Patent No.: US 10,691,082 B2
(45) Date of Patent: Jun. 23, 2020

(54) DYNAMICALLY ADJUSTING SAMPLE RATES BASED ON PERFORMANCE OF A MACHINE-LEARNING BASED MODEL FOR PERFORMING A NETWORK ASSURANCE FUNCTION IN A NETWORK ASSURANCE SYSTEM

(71) Applicant: Cisco Technology, Inc., San Jose, CA (US)

(72) Inventors: Andrea Di Pietro, Lausanne (CH); Jean-Philippe Vasseur, Saint Martin d'uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 15/831,482

(22) Filed: Dec. 5, 2017

(65) Prior Publication Data

US 2019/0171169 A1 Jun. 6, 2019

(51) Int. Cl.
*G05B 13/04* (2006.01)
*H04L 12/26* (2006.01)
*H04L 12/24* (2006.01)

(52) U.S. Cl.
CPC .......... *G05B 13/045* (2013.01); *G05B 13/04* (2013.01); *H04L 41/16* (2013.01); *H04L 43/024* (2013.01); *H04L 41/12* (2013.01); *H04L 43/16* (2013.01)

(58) Field of Classification Search
CPC ....... G05B 13/045; G05B 13/04; H04L 43/16; H04L 43/024; H04L 41/12; H04L 41/16
See application file for complete search history.

(56) References Cited

U.S. PATENT DOCUMENTS

| 5,491,796 | A | * | 2/1996 | Wanderer | H04L 41/046 709/220 |
|---|---|---|---|---|---|
| 5,602,964 | A | * | 2/1997 | Barrett | G05B 13/027 706/25 |
| 5,896,561 | A | * | 4/1999 | Schrader | H04L 1/0025 370/445 |
| 5,948,055 | A | * | 9/1999 | Pulsipher | H04L 41/22 709/202 |
| 6,173,323 | B1 | * | 1/2001 | Moghe | H04L 43/10 340/10.1 |
| 6,738,813 | B1 | * | 5/2004 | Reichman | G06Q 10/06 709/224 |
| 6,973,489 | B1 | * | 12/2005 | Levy | G06F 11/3495 709/202 |
| 6,985,722 | B1 | * | 1/2006 | Snelgrove | H04M 7/0081 370/255 |

(Continued)

*Primary Examiner* — Daniel C. Murray
(74) *Attorney, Agent, or Firm* — Behmke Innovation Group LLC; James M. Behmke; Jonathon P. Western

(57) ABSTRACT

In one embodiment, a network assurance service receives data regarding a monitored network. The service analyzes the received data using a machine learning-based model, to perform a network assurance function for the monitored network. The service detects a lowered performance of the machine learning-based model when a performance metric of the machine learning-based model is below a threshold for the performance metric. When it is determined that the lowered performance of the machine-learning based model is correlated with the sample rate of the received data, the service adjusts the sample rate of the data.

16 Claims, 11 Drawing Sheets

(56) References Cited

U.S. PATENT DOCUMENTS

| | | | | |
|---|---|---|---|---|
| 7,254,626 B1* | 8/2007 | Kommula | | H04L 67/1008 709/217 |
| 7,512,980 B2* | 3/2009 | Copeland | | H04L 63/1416 705/51 |
| 7,606,895 B1* | 10/2009 | Dini | | H04L 12/14 709/223 |
| 7,664,083 B1* | 2/2010 | Cermak | | H04L 67/22 370/338 |
| 7,912,950 B1* | 3/2011 | Saparoff | | H04L 43/103 709/223 |
| 8,015,291 B2* | 9/2011 | Chapman | | G06Q 10/06375 709/226 |
| 8,086,721 B2* | 12/2011 | See | | H04L 41/024 709/224 |
| 8,135,125 B2* | 3/2012 | Sidhu | | G06Q 10/10 379/265.02 |
| 8,208,893 B1* | 6/2012 | Ryan | | H04L 12/10 455/405 |
| 8,255,515 B1* | 8/2012 | Melman | | H04L 47/24 370/235 |
| 8,625,757 B1* | 1/2014 | Karpov | | H04M 15/58 379/112.06 |
| 8,667,113 B2* | 3/2014 | Veerabhadrappa | | H04L 41/0233 709/223 |
| 8,670,439 B2* | 3/2014 | Wei | | H04J 3/0638 370/350 |
| 9,014,691 B2* | 4/2015 | Rahman | | H04W 24/08 455/425 |
| 9,503,335 B2* | 11/2016 | Ranganathan | | G06F 11/079 |
| 9,577,906 B2* | 2/2017 | Ferreira | | H04L 43/0876 |
| 9,577,915 B2* | 2/2017 | Hui | | H04W 40/125 |
| 9,955,488 B2* | 4/2018 | Ouyang | | H04W 24/08 |
| 10,108,522 B1* | 10/2018 | Jain | | G06F 11/3409 |
| 10,135,706 B2* | 11/2018 | Basile | | H04L 43/065 |
| 10,135,862 B1* | 11/2018 | McClintock | | G06F 21/554 |
| 10,452,467 B2* | 10/2019 | Estrada | | G06F 11/3495 |
| 10,489,711 B1* | 11/2019 | Inbar | | G06N 5/04 |
| 2002/0078225 A1* | 6/2002 | Pines | | H04L 29/06 709/234 |
| 2002/0120705 A1* | 8/2002 | Schiavone | | H04L 51/12 709/207 |
| 2002/0147759 A1* | 10/2002 | Ranganathan | | G06F 9/50 718/104 |
| 2002/0165958 A1* | 11/2002 | Duffield | | H04L 12/14 709/224 |
| 2002/0188710 A1* | 12/2002 | Duffield | | H04L 41/0896 709/223 |
| 2004/0193958 A1* | 9/2004 | Shah | | G05B 23/0278 714/37 |
| 2004/0205397 A1* | 10/2004 | Rajiv | | G05B 17/02 714/25 |
| 2004/0267956 A1* | 12/2004 | Leon | | H04L 12/5602 709/231 |
| 2005/0210533 A1* | 9/2005 | Copeland | | H04L 63/1416 726/23 |
| 2005/0262237 A1* | 11/2005 | Fulton | | H04L 43/0811 709/224 |
| 2006/0025985 A1* | 2/2006 | Vinberg | | G06F 8/65 703/22 |
| 2007/0016666 A1* | 1/2007 | Duffield | | H04L 12/14 709/223 |
| 2007/0016672 A1* | 1/2007 | Wilson | | G06F 9/542 709/224 |
| 2007/0055403 A1* | 3/2007 | MacDonald | | G05B 13/04 700/108 |
| 2007/0171824 A1* | 7/2007 | Ruello | | H04L 43/022 370/232 |
| 2007/0265990 A1* | 11/2007 | Sidhu | | G06Q 10/10 705/418 |
| 2008/0109100 A1* | 5/2008 | Macharia | | C10L 1/02 700/110 |
| 2008/0267073 A1* | 10/2008 | Thaler | | H04L 12/4625 370/236 |
| 2008/0305747 A1* | 12/2008 | Aaron | | H04W 24/08 455/67.13 |
| 2009/0222556 A1* | 9/2009 | Chapman | | G06Q 10/06375 709/224 |
| 2010/0220622 A1* | 9/2010 | Wei | | H04L 41/0896 370/252 |
| 2010/0223364 A1* | 9/2010 | Wei | | H04L 29/04 709/220 |
| 2010/0251329 A1* | 9/2010 | Wei | | H04L 63/1408 726/1 |
| 2012/0204187 A1* | 8/2012 | Breiter | | G06F 9/5072 718/105 |
| 2012/0272249 A1* | 10/2012 | Beaty | | G06F 9/5083 719/318 |
| 2013/0223229 A1* | 8/2013 | Hui | | H04W 40/02 370/238 |
| 2013/0282195 A1* | 10/2013 | O'Connor | | F02C 9/26 700/291 |
| 2014/0198669 A1* | 7/2014 | Brown | | H04L 43/024 370/250 |
| 2014/0222996 A1* | 8/2014 | Vasseur | | H04L 41/16 709/224 |
| 2014/0222998 A1* | 8/2014 | Vasseur | | H04L 41/16 709/224 |
| 2015/0026749 A1* | 1/2015 | Bringuier | | H04N 21/23432 725/116 |
| 2015/0074258 A1* | 3/2015 | Ferreira | | H04L 43/0876 709/224 |
| 2015/0120914 A1* | 4/2015 | Wada | | H04L 43/0882 709/224 |
| 2015/0149850 A1* | 5/2015 | Leach | | H04L 43/08 714/751 |
| 2015/0271035 A1* | 9/2015 | Colon | | H04L 41/142 709/224 |
| 2016/0021014 A1* | 1/2016 | Wetterwald | | H04L 47/2441 370/235 |
| 2016/0028599 A1* | 1/2016 | Vasseur | | H04L 41/16 370/252 |
| 2016/0134514 A1* | 5/2016 | Hui | | H04W 40/125 370/254 |
| 2016/0315993 A1* | 10/2016 | Li | | H04L 45/123 |
| 2016/0359943 A1* | 12/2016 | Huang | | H04L 65/80 |
| 2017/0093640 A1* | 3/2017 | Subramanian | | H04L 41/12 |
| 2017/0093648 A1* | 3/2017 | ElArabawy | | H04L 41/5067 |
| 2017/0126550 A1* | 5/2017 | Taylor | | H04L 41/0816 |
| 2017/0161409 A1* | 6/2017 | Martin | | G06F 17/5009 |
| 2017/0220407 A1* | 8/2017 | Estrada | | G06F 11/0751 |
| 2017/0290024 A1* | 10/2017 | Ouyang | | H04L 41/0896 |
| 2017/0353293 A1* | 12/2017 | Chandar | | G06F 17/18 |
| 2017/0364931 A1* | 12/2017 | Khavronin | | G06Q 30/0201 |
| 2018/0091390 A1* | 3/2018 | Yang | | H04L 43/04 |
| 2018/0295037 A1* | 10/2018 | Basile | | H04L 43/065 |
| 2019/0058639 A1* | 2/2019 | Rangavjhala | | G06F 11/3409 |
| 2019/0114245 A1* | 4/2019 | Mermoud | | G06F 11/3409 |

* cited by examiner

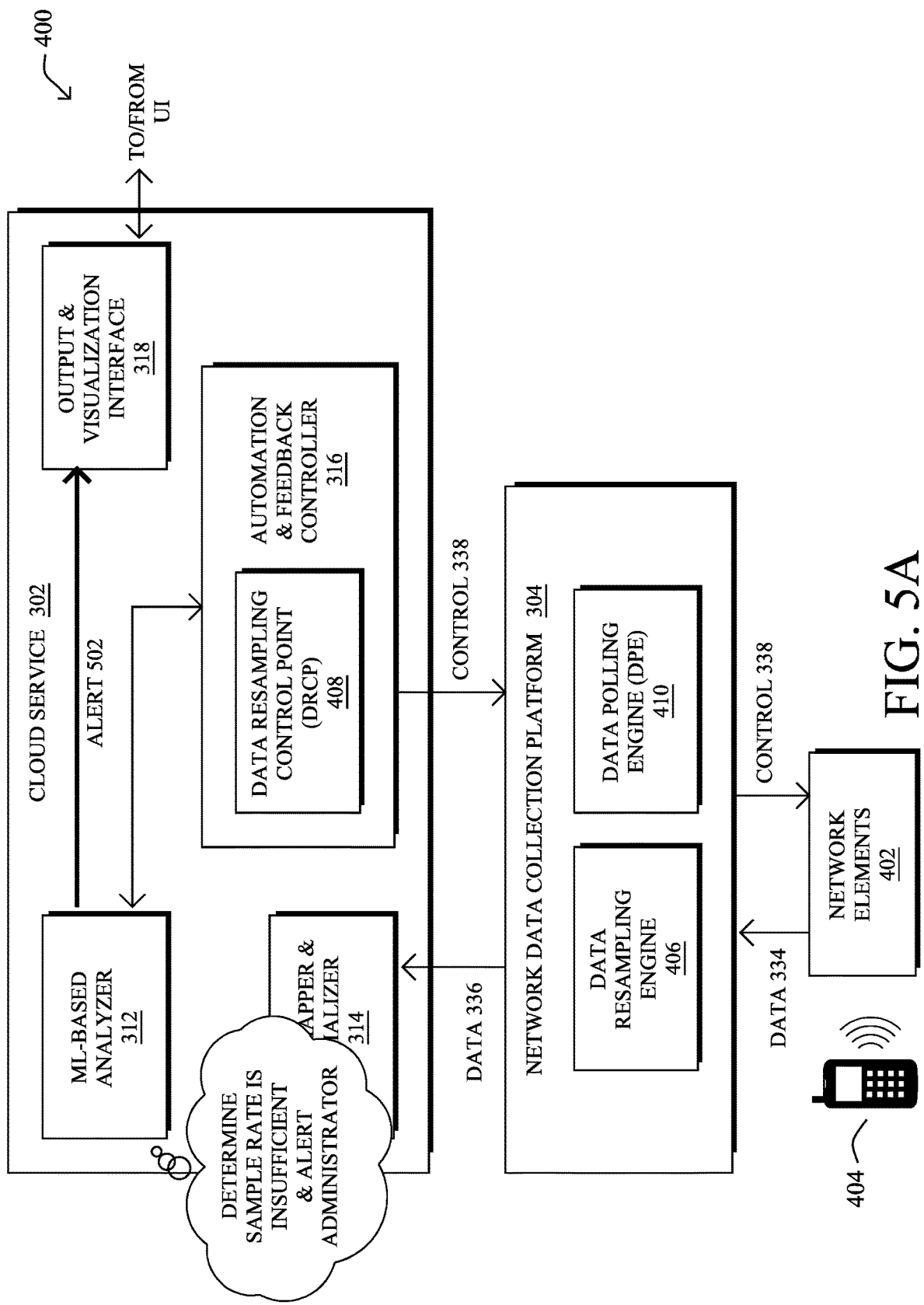

DYNAMICALLY ADJUSTING SAMPLE RATES BASED ON PERFORMANCE OF A MACHINE-LEARNING BASED MODEL FOR PERFORMING A NETWORK ASSURANCE FUNCTION IN A NETWORK ASSURANCE SYSTEM

TECHNICAL FIELD

The present disclosure relates generally to computer networks, and, more particularly, to dynamically adjusting sample rates in a machine learning-based network assurance system.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5E illustrate examples of the architecture of FIG. 4 during operation.

DESCRIPTION OF EXAMPLE EMBODIMENTS

Overview

Figure 1A:
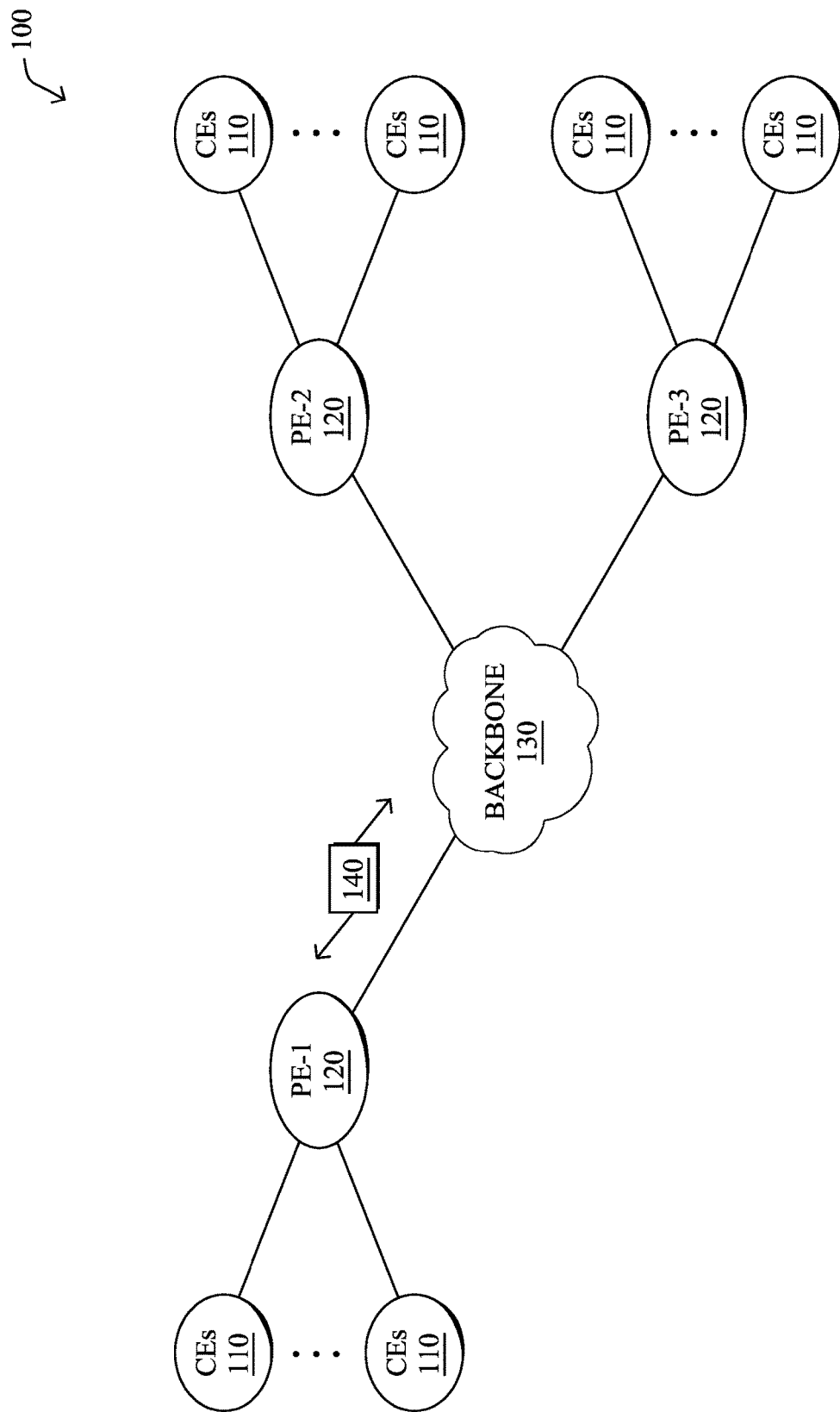
FIGS. 1A-1B illustrate an example communication network.

According to one or more embodiments of the disclosure, a network assurance service receives data regarding a monitored network. The service analyzes the received data using a machine learning-based model, to perform a network assurance function for the monitored network. The service determines that performance of the model is negatively affected by a sample rate of the received data. The service adjusts the sample rate of the data, based on the determination that the performance of the model is is negatively affected by the sample rate of the received data.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
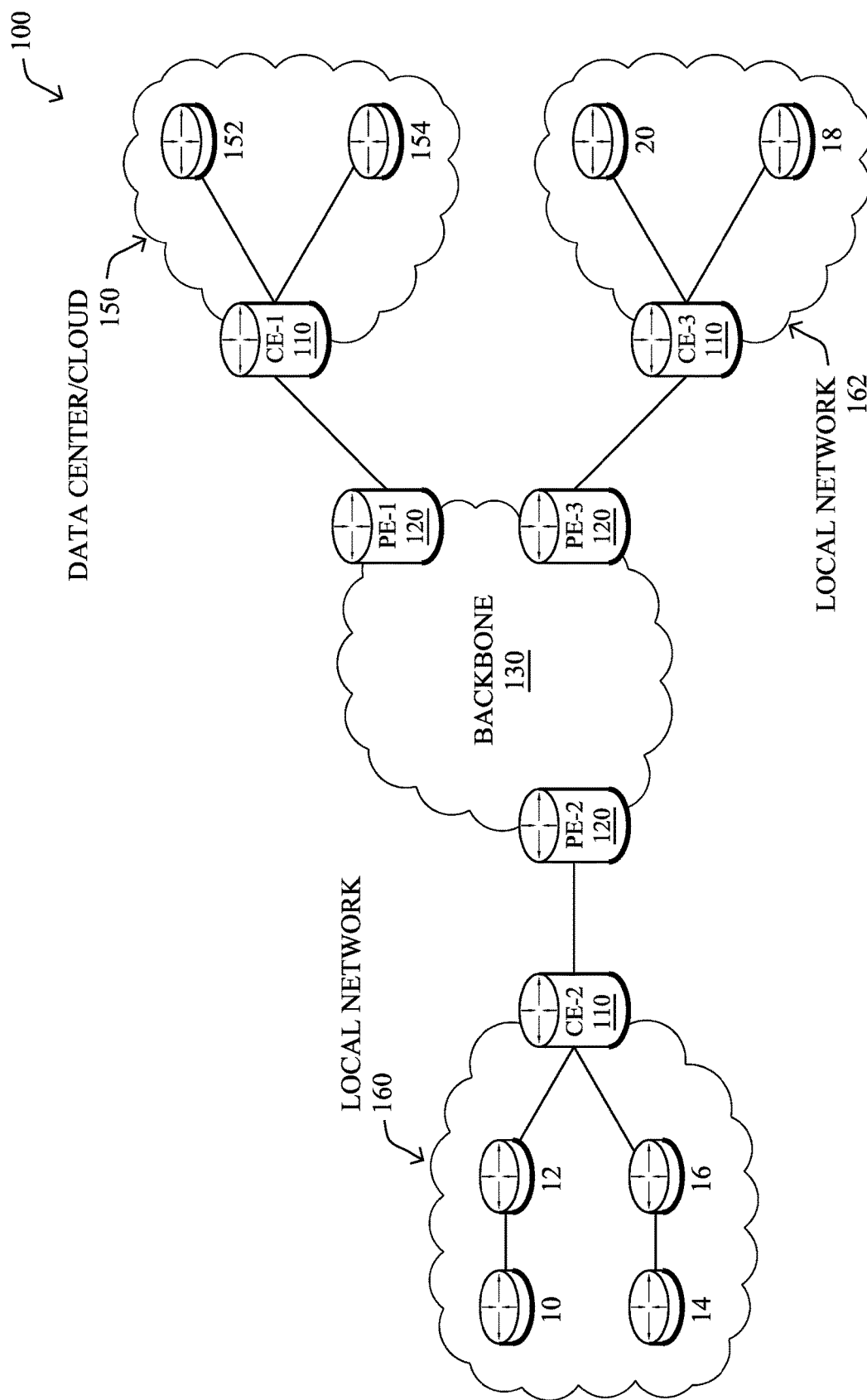

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., is are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
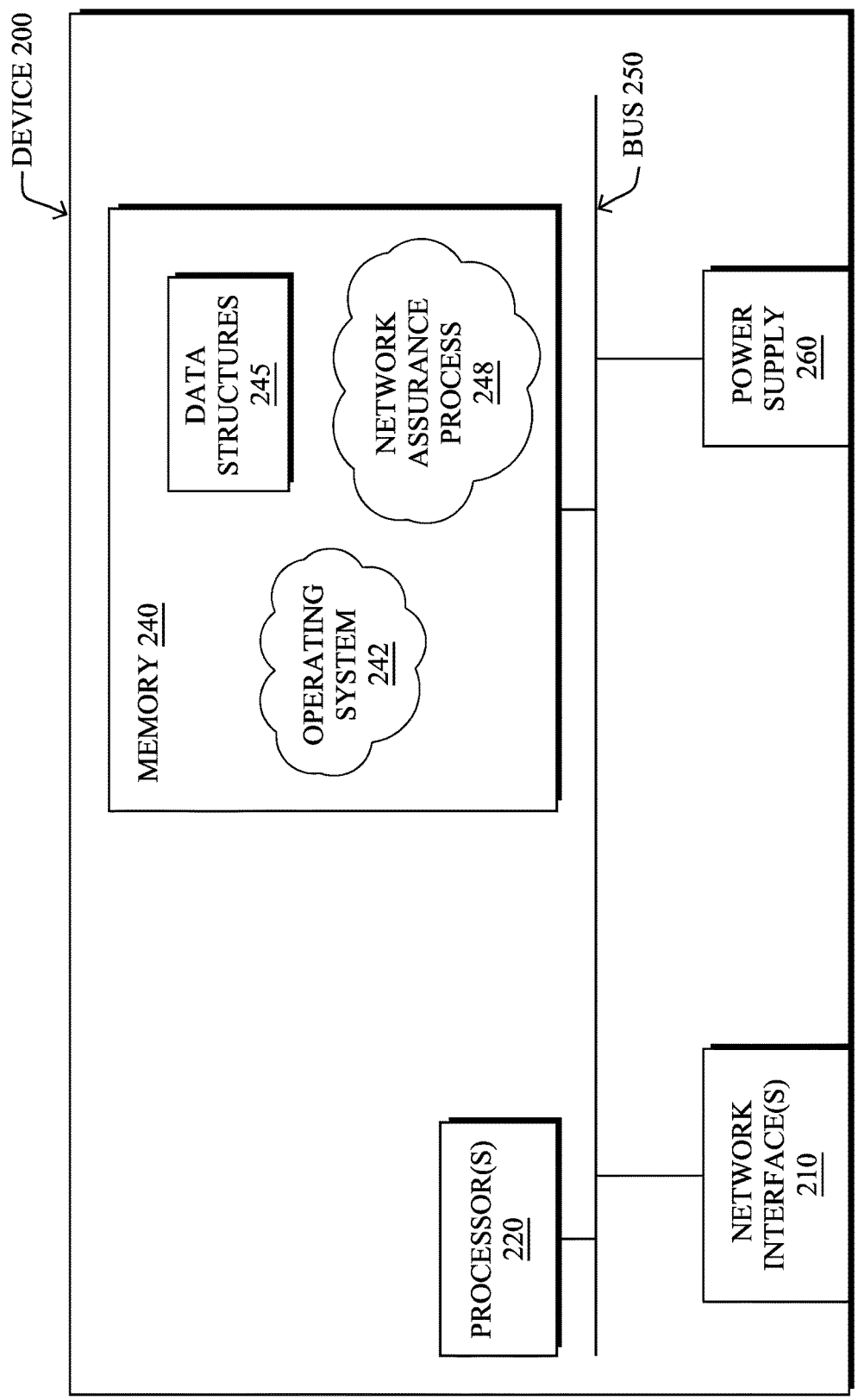
FIG. 2 illustrates an example network device/node.

FIG. 2 is a schematic block diagram of an example node/device 200 that may be used with one or more embodiments described herein, e.g., as any of the computing is devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the is description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
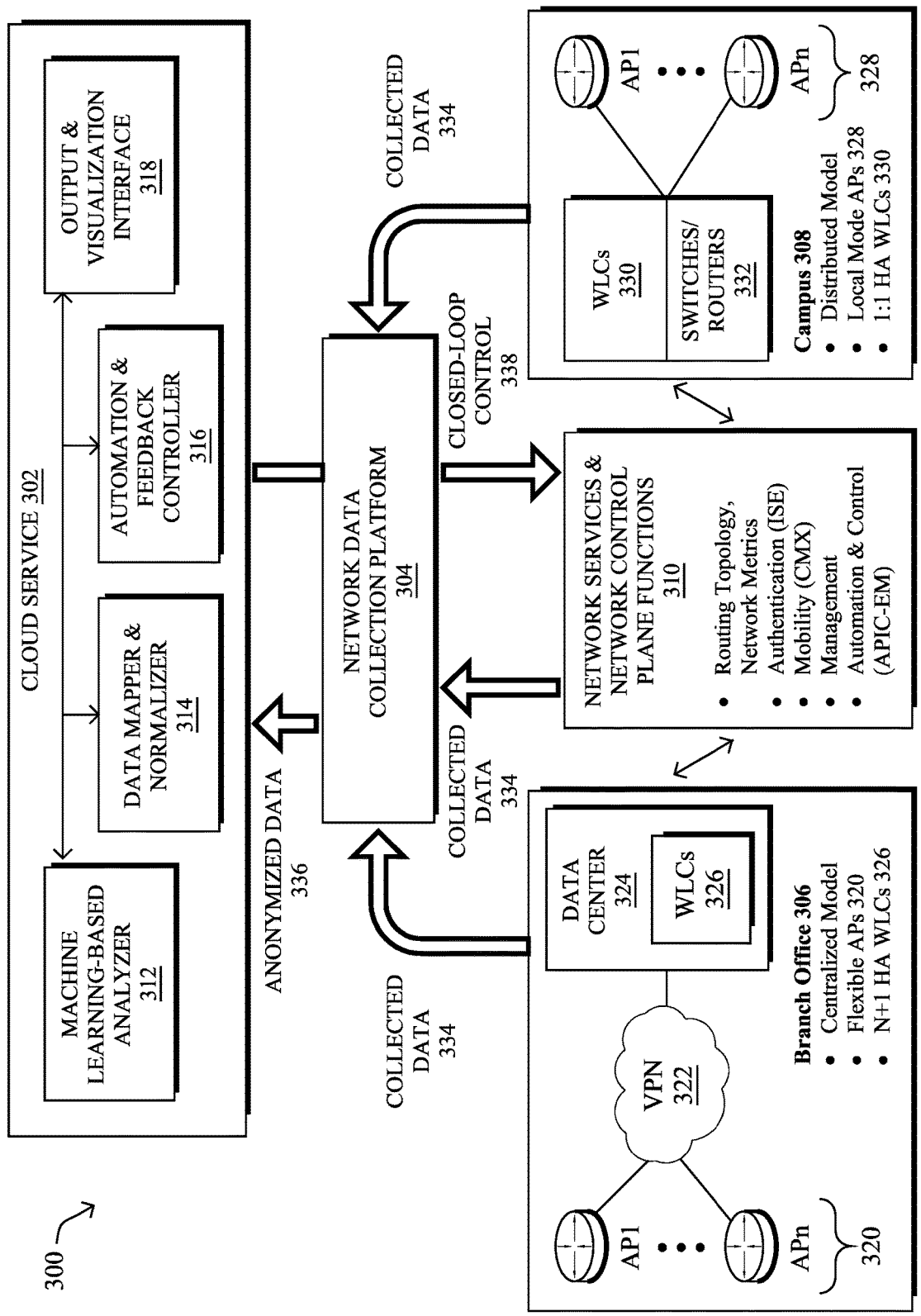
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the is network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify is and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to is predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 is to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, network assurance system 300 may use machine learning in support of cognitive analytics for the network, predictive analytics, such as models used to predict user experience), troubleshooting with root cause analysis, and/or trending analysis for capacity planning. Notably, at the core of network assurance system 300 is a highly powerful machine learning-based analyzer 312 capable of understanding network dynamics, predicting behaviors and user experience and, consequently, potential issues is before they happen, allowing for remediation. In addition, network assurance system 300 can support various types of monitored networks, such as wired and wireless networks, as well as the IoT.

The frequency of data points to process can affect the performance of a machine learning process. Especially in case of supervised techniques, a machine learning-based model, which has been trained on a data set collected at a specific frequency, can be completely ineffective when processing data collected at a different frequency. For example, a model describing data throughput at a time scale of one hour will hardly be effective on a throughput signal computed on a time scale of one minute, which will be much more irregular.

Unfortunately, the frequency at which data is available for analysis is not always under the control of the entity performing the data collection. In many cases, the information is produced by the network elements in the monitored network and provided to the data collector in push mode. This is the case for many network monitoring protocols, such as Netflow, SNMP traps, and the recent Cisco Assurance™ data format, such as JSON files. For example, in some implementations, collected data 334 may be provided on a push basis, for assessment by machine learning-based analyzer 312 in cloud service 302. Consequently, the frequency at which the data will be available will depend on the health of the reporting network element, its software version, its configuration, the amount of resources available on it and sometimes the amount of network resources available (e.g., branch office 306 may be experiencing a congested WAN link, thereby affecting the reporting of collected data 334). For the same network element, the frequency of generated data samples may greatly vary over time.

A prototype of network assurance system 300 was constructed and it was found during testing that the amount of assurance/sampled data reports generated per day by the same wireless controller varied considerably. This phenomenon was found to be quite common.

Dynamically Adjusting Sample Rates in a Machine Learning-Based Network Assurance System The techniques herein allow for the dynamic adjustment of sample rates in a machine learning-based network assurance system, based on the performance of the machine learning model(s) at the core of the system. In some aspects, a closed loop control mechanism is introduced for a network assurance system in which a push mode data source is coupled with a network protocol working in polling mode, to collect additional information when the original sample frequency results in poor machine learning performance. In some aspects, this complementary data collection activity may be driven by the machine learning process itself, which actively monitors the impact of the sample frequencies on its data quality.

Specifically, according to one or more embodiments of the disclosure as described in detail below, a network assurance service receives data regarding a monitored network. The service analyzes the received data using a machine learning-based model, to perform a network assurance function for the monitored network. The service determines that performance of the model is negatively affected by a sample rate of the received data. The service adjusts the sample rate of the data, based on the determination that the performance of the model is negatively affected by the sample rate of the received data.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
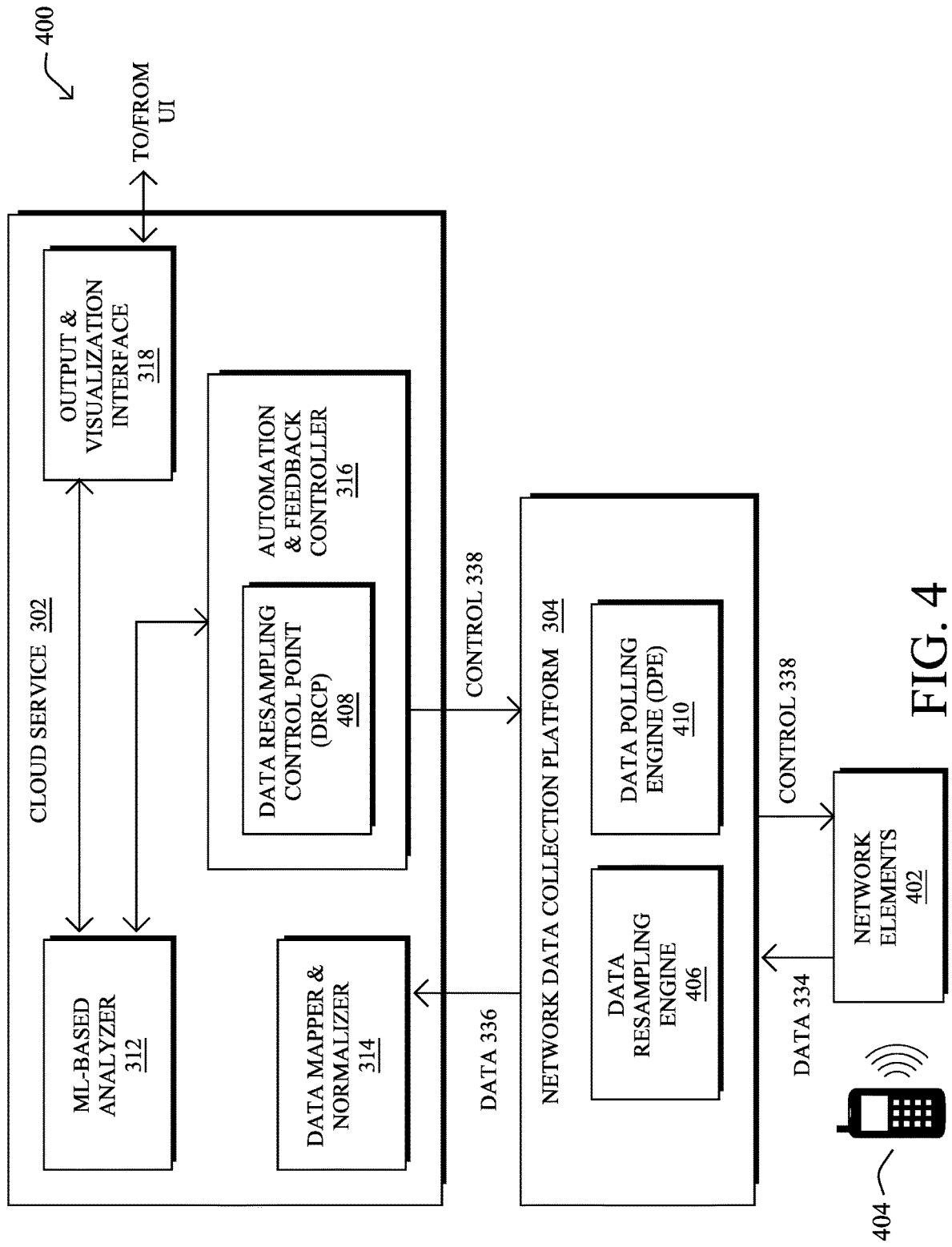
FIG. 4 illustrates an example architecture for dynamically adjusting sample rates in a network assurance system.

Operationally, FIG. 4 illustrates an example architecture 400 for dynamically adjusting sample rates in a network assurance system, according to various embodiments. In general, architecture 400 may include any or all of the following components: a data resampling engine 406, a data resampling control point 408, and/or a data polling engine 410. In various embodiments, the components of architecture 400 may be implemented within a network assurance system, such as system 300 shown in FIG. 3. Accordingly, the components 406-410 of architecture 400 shown may be implemented as part of cloud service 302, as part of network data collection platform 304, and/or on one or more network elements/entities 402 within the monitored network itself. For example, in one embodiment, data resampling engine 406 and data polling engine 410 may be implemented as part of network data collection platform 304. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, a client device 404 may leverage one or more of network elements 402, to communicate with the local network. For example, network elements 402 may include wireless APs, WLC, switches, routers, or the like, that provide network connectivity to client device 404. In turn, network elements 402 may report information regarding the network to network data collection platform 304 as part of data 334. Network data collection platform 304 may then pass this data on to cloud service 302 for analysis by machine learning (ML)-based analyzer 312.

In various embodiments, a common data model may be used in architecture 400 that provides a mapping between different data formats to correspond to the same piece of information. For example, this data model may specify that field 'F' of SNMP MIB 'M' corresponds to field 'G' in the reported assurance messages in data 334, and that both will map to variable 'V,' processed by machine learning-based analyzer 312. Also, this model may list any conversion operations needed to convert values from one source to another.

For example, the data model may appear as follows:
name: mac
  type: string
  key:
    kind: primary
    implicit: true
  source:
    snmp:
      AIRESPACE-WIRELESS-MIB:
        bsnAPDot3MACAddress
      CISCO-LWAPP-AP-MIB: cLApSysMacAddress
    wsa: "aps[ ].mac"
    snmpConversionFunction: CapitalizeString
    anonymization: sha1

The above example specifies that machine learning-based analyzer 312 will consume a variable called 'mac,' which corresponds to two equivalent SNMP variables and a particular field in the assurance message.

The central component of architecture 400 is machine learning-based analyzer 312 that hosts one or more machine learning-based models using the data received from the monitored network(s) to perform one or more network assurance functions (e.g., cognitive analytics, predictive analytics, trend analysis, etc.). During normal operation of architecture 400, network elements 402 may provide the collected data 334 for analysis on a push basis. That is to say that a given report may be sent for analysis without first receiving a specific request for the information. For example, a measurement taken by a network element 402 may be sent to network data collection platform 304 as part of a data reporting stream that is provided automatically. This contrasts with data collection that is performed on a pull basis in which the collected data is provided only in response to a specific request for the data (e.g., a network element 402 sends data 334, in response to an explicit request for the data from network data collection platform 304, as opposed to simply sending the data).

Figure 5B:
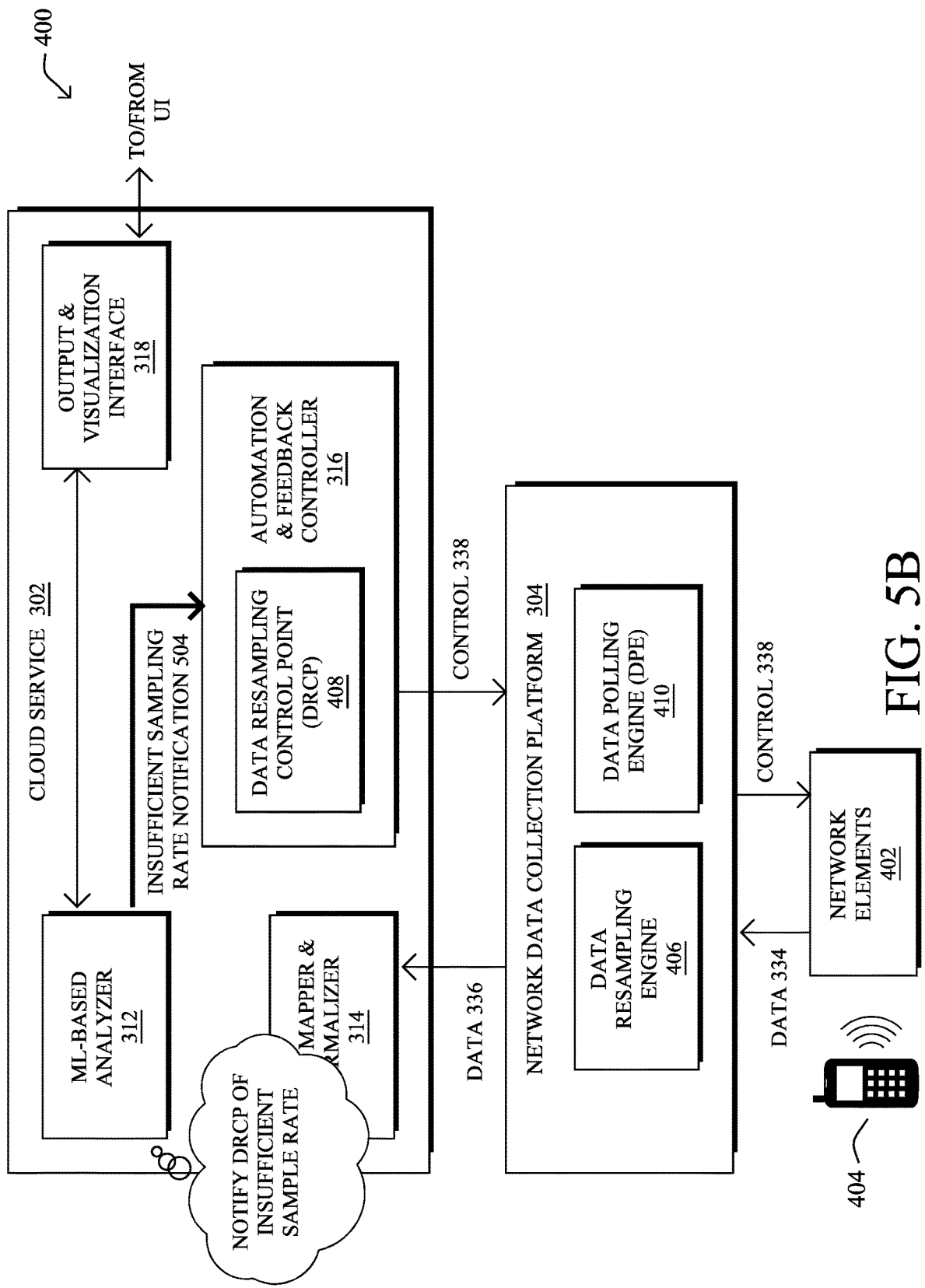

FIGS. 5A-5E illustrate examples of the architecture 400 of FIG. 4 during operation. In various embodiments, a key aspect of the techniques herein lies in the ability for machine learning-based analyzer 312 to determine that the rate at which a is given variable is received for analysis is too low, which can compromise the performance of machine learning-based analyzer 312. For example, as shown in FIG. 5A, machine learning-based analyzer 312 may determine that the sample rate at which it receives a certain metric regarding the monitored network is insufficient for healthy operation of analyzer 312. In some embodiments, machine learning-based analyzer 312 may make this determination based on a detected change in its performance in terms of precision, recall, prediction accuracy, or any other performance metric of interest for a machine learning model. Notably, if the performance of analyzer 312 drops below a set threshold, analyzer 312 may determine that this is due to the sample rate of the reported data being too low and/or attributable to significant fluctuations in the sample rate.

In general, the sample rate for the data regarding the monitored network refers to the rate at which the data is received by machine learning-based analyzer 312 for analysis. This may or may not correspond to the actual rate at which network elements 402 capture the data.

By way of example, assume that machine learning-based analyzer 312 comprises a long short-term memory (LSTM)-based model, which is a type of recurrent neural network, for predictive analytics. In such a case, it may be possible for analyzer 312 to determine whether there is a correlation between the performance of the model and the sample frequency, thus potentially determining a minimum bound for the sample rate at which point the rate is insufficient (e.g., negatively affects the performance of the LSTM-based model).

In another example, if machine learning-based analyzer 312 comprises a machine learning classifier, analyzer 312 may evaluate the precision and/or recall of the classifier, to detect potential drops that are correlated with an insufficient sample rate for the input data of the classifier. In another embodiment, analyzer 312 may have been trained with a lower bound of sampling frequency for input features, requiring active polling when this lower bound is crossed.

Upon detecting lowered performance attributable to a low data sample rate, is machine learning-based analyzer 312 may first sends an alert 502 to an administrator/user, via output and visualization interface 318, to notify the user of the insufficient sample rate. Notably, interface 318 may convey alert 502 to a user interface (UI), such as an electronic display or other device with which the user may interact. In some embodiments, cloud service 302 may receive a response back from the UI that controls how cloud service 302 is to handle the insufficient sample rate. In one embodiment, the response may indicate a policy that controls how cloud service 302 is to adjust the sample rate (e.g., by specifying which protocol to use, which device to poll, etc.).

In some embodiments, machine learning-based analyzer 312 may disable the machine learning-based model negatively affected by the sample rate, until the sample rate is again at a sufficient level for performance of the model. For example, analyzer 312 may automatically disable the model, when the sample rate is deemed insufficient. In another embodiment, analyzer 312 may disable the offending model, in response to receiving an instruction from an administrator via output and visualization interface 318 (e.g., in response to sending alert 502 for review).

As shown in FIG. 5B, to rectify the insufficient sample rate, machine learning-based analyzer 312 may send a custom insufficient sample rate notification 504 to data resampling control point (DRCP) 408, whose functions are described below. Notification 504 may include any or all of the following:

The variable for which the sample frequency is considered to be too low (with reference to the afore mentioned data model)
The required frequency for such a variable
The list of models which are impacted
The particular sources for the problematic feed (e.g., a router or a wireless controller)

In response to receiving insufficient sampling rate notification 504 from machine learning-based analyzer 312, DRCP 408 may perform any or all of the following:

Determine whether the data with insufficient sample frequency can be obtained by using an alternative polling protocol. Such a decision may be based on the information included in the unified data model shared by the components of architecture 400.

Determine whether the polling protocol is available for the particular network element 402 which is the source of the problematic data. Optionally, DRCP 408 can interact with a network controller for the monitored network, such as APIC-EM, to retrieve some health metrics for such a data source. The purpose of this may be to verify whether the polling can potentially interfere with the normal operations of the target network element 402.

Compare its content against a set of polling policies that may be predefined or specified by the user/administrator of the network assurance system. For example, such a polling policy may be based on any or all of the following:
the list of models impacted by the data frequency issue
the minimum sampling frequency required by the machine learning-based model of analyzer 312 to be functional
the particular protocol to be used for polling network element(s) 402
the health of the network element(s) 402, if collected at the step above
the identity of the polled network element(s) 402

For example, an administrator of the network assurance system may specify a polling policy for DRCP 408 that avoids performing SNMP polling for a particular network element 402 unless the sample rate issue affects a critical machine learning-based model in analyzer 312. In another example, the policy may allow the polling operation using SNMP, but with a reduced polling frequency.

Figure 5C:
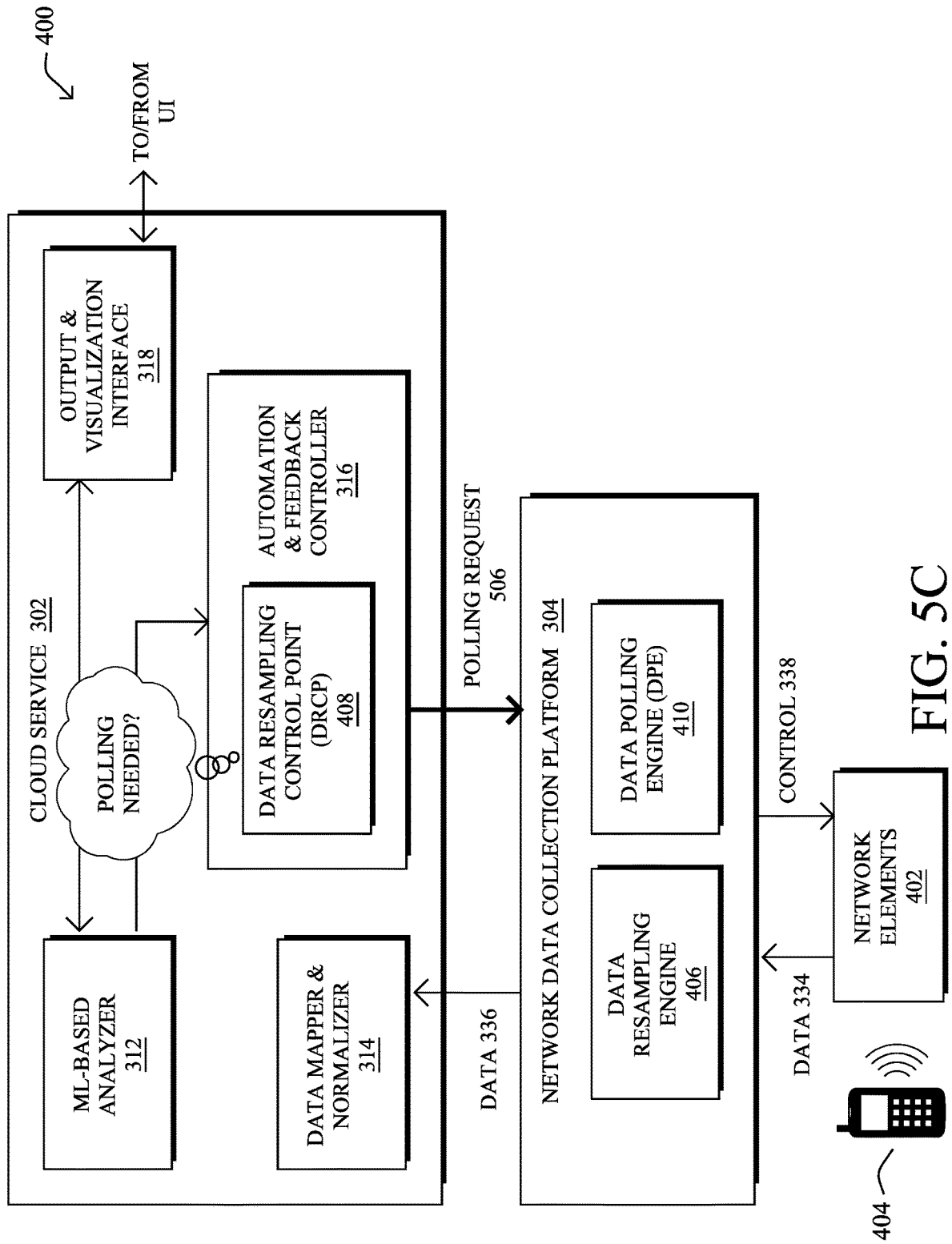
Figure 5D:
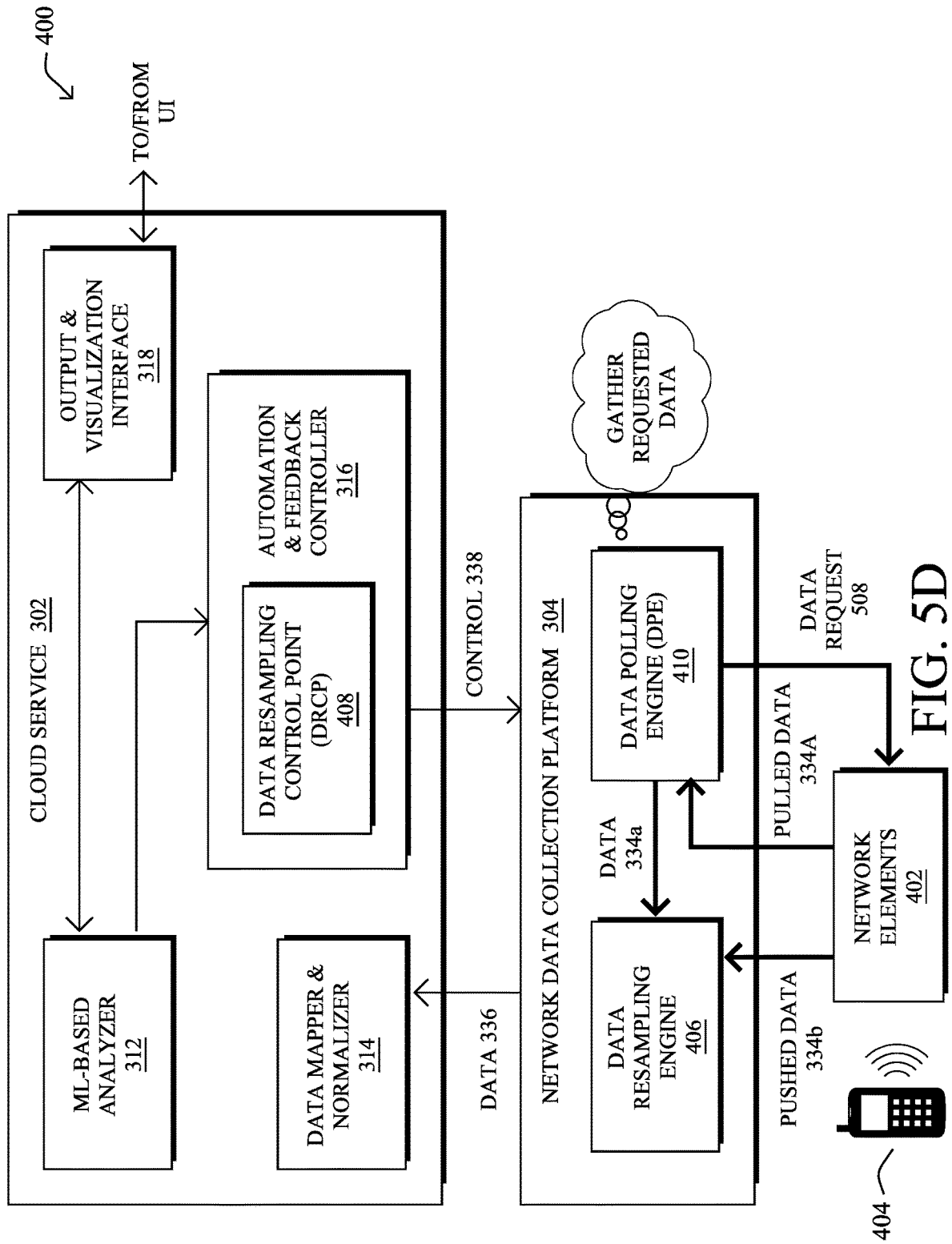

As shown in FIG. 5C, if DRCP 408 determines that some polling action will need to be taken, it may send a custom polling request 506 message to data polling engine (DPE) 410, to initiate data polling of one or more network elements 402. For example, is polling request 506 may specify any or all of the following:
the protocol to be used for polling (e.g., SNMP, Cisco CLI, NETCONF/YANG, etc.)
the particular information to be polled (e.g., an SNMP MIB/variable, a command line instruction command, etc.)
the polling rate As shown in FIG. 5D, on reception of polling request 506 from DRCP 408, DPE 410 may:
Gather the requested data as instructed by polling request 506
Relay the requested data to data resampling engine 406
In implementations in which DPE 410 is located on premises with the monitored network, apply some form of pre-processing. This may include compression, since some polling protocols like SNMP are known not to be very bandwidth efficient, and/or anonymization. Note that anonymization by the network data collection platform 304 may be needed in cases where the polling protocols are only designed for local collection and do not anonymize sensitive information.

If a higher re-sampling rate cannot be achieved (e.g., because of high CPU usage by a network element 402, limited network resources, etc.), DPE 410 may send a negative message back to the requester, which may in turn, de-activate the related machine learning task of analyzer 312, until the minimum required sample rate can be restored.

More specifically, as shown in FIG. 5D, DPE 410 may send one or more data request 508 to one or more network elements 402. For example, data request 508 may be an SNMP request for a certain variable captured by the network element 402. In turn, the network element(s) 402 may respond to data request 508 by sending the pulled data 334a back to DPE 410. DPE 410 may then send the pulled data 334a on to data resampling is engine 406 for further processing. Note that while this is occurring, the network elements 402 may continue to provide its normal captured data to network data collection platform 304 on a push basis (e.g., as pushed data 334b, for purposes of illustration).

Figure 5E:
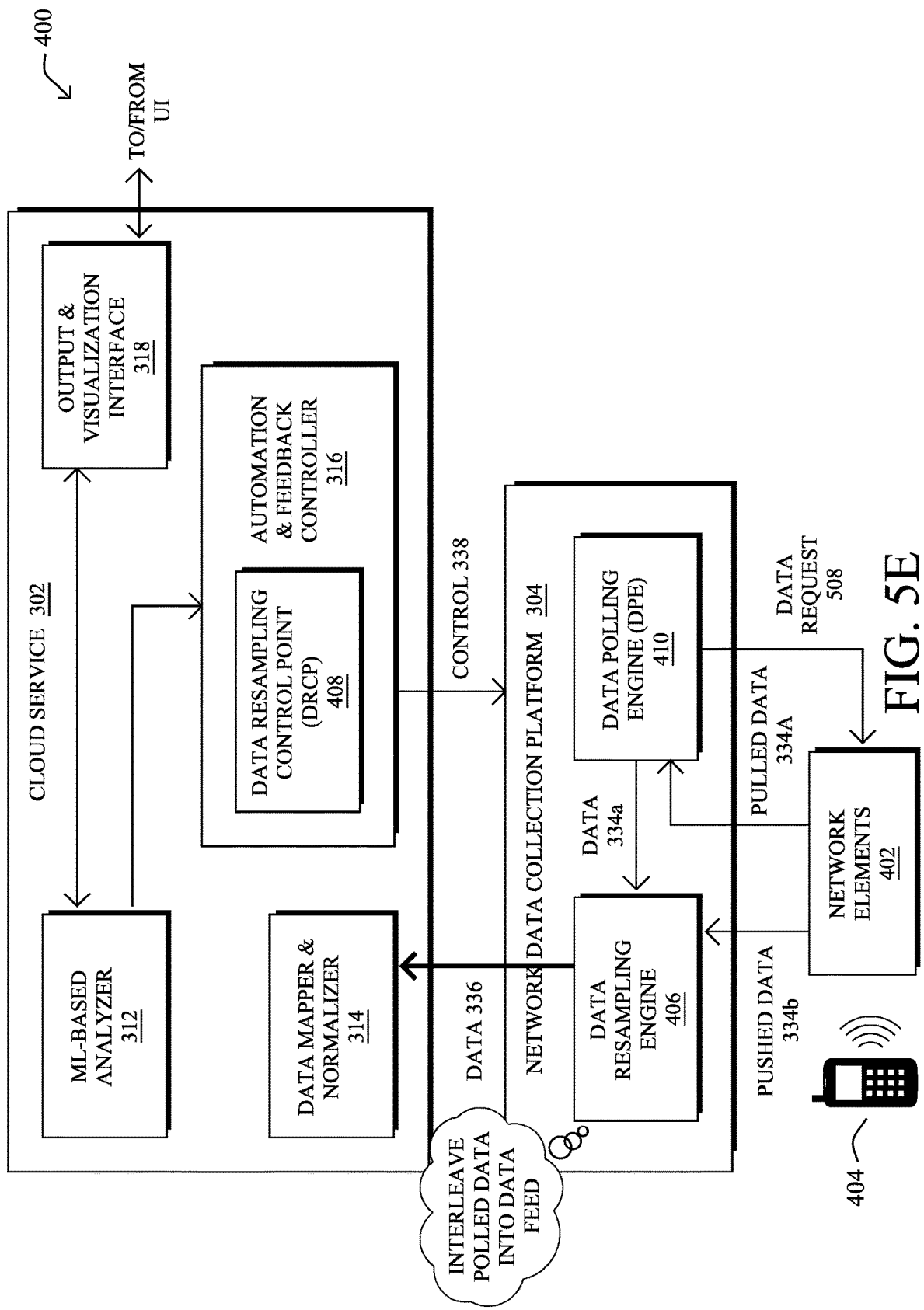

As shown in FIG. 5E, in various embodiments, data resampling engine may be configured to perform any or all of the following:

Receive both pushed data 334b from network elements 402 and pulled data 334a from DPE 410.

Convert pulled data 334a and pushed data 334b into to a uniform format by using the unified data model shared across architecture 400.

Interleave data 334a and 334b, so as to create a continuous data feed 336 with the right temporal granularity.

Thus, in some embodiments, architecture 400 may adjust the sample rate of the input data to machine learning-based analyzer 312 by dynamically polling network elements 402 for additional data that can be interleaved into the data stream with the data reported on a push basis. For example, by polling network entities 402 at a rate that is equal to that of the rate at which network entities 402 report captured data on a push basis, and interleaving the results, the sample rate at which machine learning-based analyzer 312 receives captured data for consumption can be effectively doubled.

In another embodiment, architecture 400 may also implement a feedback loop, to detect the right polling frequency for the additional data. In particular, once the additional polling based feed have been put in place, DRCP 408 may notify machine learning-based analyzer 312 that additional data is being provided through explicit polling. In turn, machine learning-based analyzer 312 may monitor the impact of this sample rate change and verify that the sample rate issues have indeed been resolved. If not, machine learning-based analyzer 312 may send another insufficient sample rate notification to DRCP 408 with a flag set to increase the sample rate even further. This may be repeated any number of times, until the sample rate is brought up to a rate that does not negatively impact the performance of the machine learning-based model of is analyzer 312.

Figure 6:
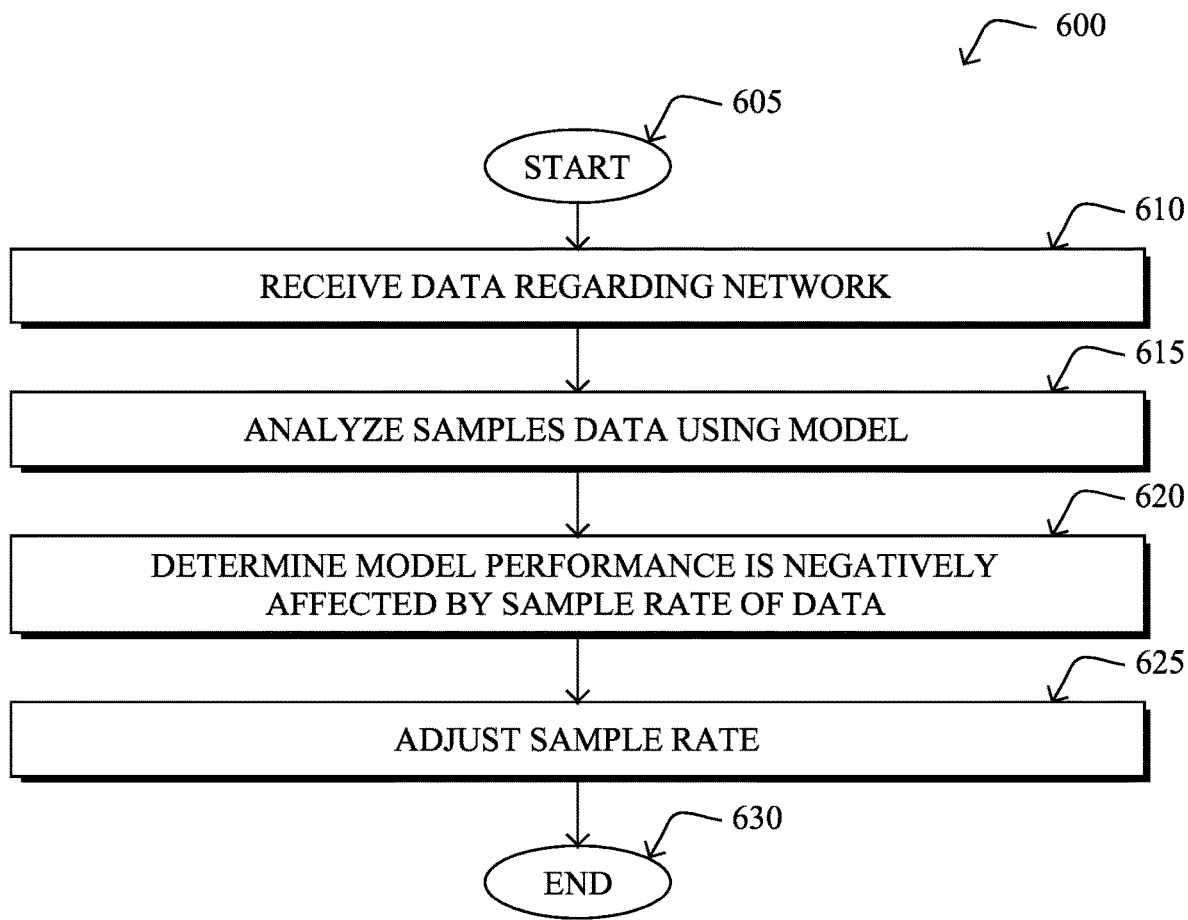
FIG. 6 illustrates an example simplified procedure for adjusting a sample rate in a network assurance system.

FIG. 6 illustrates an example simplified procedure for adjusting a sample rate in a network assurance system, in accordance with one or more embodiments described herein. For example, a non-generic, specifically configured device (e.g., device 200) may perform procedure 600 by executing stored instructions (e.g., process 248) and provide a network assurance service. The procedure 600 may start at step 605, and continues to step 610, where, as described in greater detail above, the service may receive data regarding a monitored network. Such data may include any number of captured metrics, state information, or the like, indicative of the operation of the monitored network.

At step 615, as detailed above, the service may analyze the received data using a machine learning-based model, to perform a network assurance function for the monitored network. For example, such a network assurance function may include cognitive analytics of the monitored network to identify a device behavior in the monitored network, predictive analytics to predict a future condition of the monitored network, or trending analysis for capacity planning in the monitored network.

At step 620, the service may determine that performance of the model is negatively affected by a sample rate of the received data, as described in greater detail above. In various embodiments, the service may do so by identifying a drop in precision, recall, or prediction accuracy of the model. Such performance measures for the model can be based on observations of the network itself (e.g., if a predicted behavior was not actually observed) and/or may be based on feedback provided by a user (e.g., the service misclassified the captured data).

At step 625, as detailed above, the service may adjust the sample rate of the data, based on the determination that the performance of the model is negatively affected by the sample rate of the received data. In various embodiments, the service may make the sample rate adjustments by initiating polling of data regarding the network or increasing such a polling rate. In turn, this polled data may be included with captured data regarding the network that is provided to the service on a push basis, thereby changing the overall rate at which the service receives the data regarding the network. Said differently, the data regarding the network may be sent to the service for analysis on a push basis, by default, but this may be supplemented as needed with additional data reported on a pull basis. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a network assurance system to dynamically adjust the sample rate at which data regarding a monitored network is received for analysis. In particular, the system may detect when performance of its machine learning-based analyzer is below a threshold level due to too low of a sample rate and, in turn, dynamically adjust the sample rate.

While there have been shown and described illustrative embodiments that provide for dynamically adjusting sample rates in a machine learning-based network assurance system, it is to be understood that various other adaptations and modifications may be made within the spirit and scope of the embodiments herein. For example, while certain embodiments are described herein with respect to using certain models for purposes of cognitive analysis, predictive analysis, or trending analysis, the models are not limited as such and may be used for other functions, in other embodiments. In addition, while certain protocols are shown, such as SNMP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable is medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a network assurance service, data regarding a monitored network, the received data including data provided to the network assurance service on a push basis;
interleaving, by the network assurance service, additional data regarding the monitored network received by polling one or more network elements in the monitored network on a pull basis with the data provided to the network assurance service on the push basis;
analyzing, by the network assurance service, the additional data received on the pull basis interleaved with the data provided to the network assurance service on the push basis using a machine learning-based model for performing a network assurance function for the monitored network;
detecting, by the network assurance service, a lowered performance of the machine learning-based model when a performance metric of the machine learning-based model is below a threshold for the performance metric;
determining, by the network assurance service, whether the lowered performance of the machine learning-based model is correlated with a sample rate of the received data; and
increasing, by the network assurance service, the sample rate of the received data when it is determined that the lowered performance of the machine-learning based model is correlated with the sample rate of the received data.

2. The method as in claim 1, wherein the detecting of the lowered performance of the machine learning-based model comprises:
identifying, by the network assurance service, a drop in precision, recall, or prediction accuracy of the machine learning-based model.

3. The method as in claim 1, wherein the network assurance function comprises at least one of: cognitive analytics of the monitored network to identify a device behavior in the monitored network, predictive analytics to predict a future condition of the monitored network, or trending analysis for capacity planning in the monitored network.

4. The method as in claim 1, further comprising:
providing, by the network assurance service and to a user interface, an indication that the lowered performance of the machine learning-based model is correlated with the sample rate of the received data; and
receiving, at the network assurance service and from the user interface, a policy that controls the adjustment of the sample rate of the received data.

5. The method as in claim 4, wherein the policy indicates a particular protocol to be used to adjust the sample rate of the received data.

6. The method as in claim 1, further comprising:
disabling, by the network assurance service, the machine learning-based model until the sample rate of the received data is adjusted.

7. The method as in claim 1, wherein the data regarding the monitored network comprises data reported by a wireless local area network controller.

8. An apparatus comprising:
one or more network interfaces to communicate with a monitored network;
a memory configured to store computer program instructions for performing a process; and
a processor coupled to the one or more network interfaces and configured to execute the computer program instructions, wherein, upon execution of the program instructions, the processor is configured to:
receive data regarding the monitored network, the received data including data provided to the network assurance service on a push basis;
interleaving, by the network assurance service, additional data regarding the monitored network received by polling one or more network elements in the monitored network on a pull basis with the data provided to the network assurance service on the push basis;
analyze the additional data received on the pull basis interleaved with the data provided to the network assurance service on the push basis using a machine learning-based model for performing a network assurance function for the monitored network;
detect a lowered performance of the machine learning-based model when a performance metric of the machine learning-based model is below a threshold for the performance metric;
determine whether the lowered performance of the machine learning-based model is correlated with a sample rate of the received data; and
increase the sample rate of the received data when it is determined that the lowered performance of the machine learning-based model is correlated with the sample rate of the received data.

9. The apparatus as in claim 8, wherein, when the apparatus detects the lowered performance of the machine learning-based model, the processor is configured to:
identify a drop in precision, recall, or prediction accuracy of the machine learning-based model.

10. The apparatus as in claim 8, wherein the network assurance function comprises at least one of: cognitive analytics of the monitored network to identify a device behavior in the monitored network, predictive analytics to predict a future condition of the monitored network, or trending analysis for capacity planning in the monitored network.

11. The apparatus as in claim 8, wherein the processor is further configured to:
provide, to a user interface, an indication that the lowered performance of the machine learning-based model is correlated with the sample rate of the received data; and
receive, from the user interface, a policy that controls the adjustment of the sample rate of the received data.

12. The apparatus as in claim 11, wherein the policy indicates a particular protocol to be used to adjust the sample rate of the received data.

13. The apparatus as in claim 8, wherein the processor is further configured to:
disable the machine learning-based model until the sample rate of the data is adjusted.

14. The apparatus as in claim 8, wherein the data regarding the monitored network comprises data reported by a wireless local area network controller.

15. A tangible, non-transitory, computer-readable medium storing program instructions that cause a network assurance service to execute a process comprising:
- receiving, at the network assurance service, data regarding a monitored network, the received data including data provided to the network assurance service on a push basis;
- interleaving, by the network assurance service, additional data regarding the monitored network received by polling one or more network elements in the monitored network on a pull basis with the data provided to the network assurance service on the push basis;
- analyzing, by the network assurance service, the additional data received on the pull basis interleaved with the data provided to the network assurance service on the push basis using a machine learning-based model for performing a network assurance function for the monitored network;
- detecting, by the network assurance service, a lowered performance of the machine learning-based model when a performance metric of the machine learning-based model is below a threshold for the performance metric;
- determining, by the network assurance service, whether the lowered performance of the machine learning-based model is correlated with a sample rate of the received data; and
- increasing, by the network assurance service, the sample rate of the received data when it is determined that that the lowered performance of the machine learning-based model is correlated with the sample rate of the received data.

16. The computer-readable medium as in claim 15, wherein the process further comprises:
- using a uniform data model to interleave the additional data received on the pull basis with the data provided to the network assurance service on the push basis.

* * * * *

UNITED STATES PATENT AND TRADEMARK OFFICE
CERTIFICATE OF CORRECTION

PATENT NO. : 10,691,082 B2  
APPLICATION NO. : 15/831482  
DATED : June 23, 2020  
INVENTOR(S) : Andrea Di Pietro et al.

Page 1 of 2

It is certified that error appears in the above-identified patent and that said Letters Patent is hereby corrected as shown below:

In the Specification

In Column 1, Line 59, amend as shown:
tion that the performance of the model is negatively In Column 4, Line 19, amend as shown:
PLC networks, etc., are often on what is referred to as In Column 4, Line 61, amend as shown:
ments described herein, e.g., as any of the computing In Column 5, Line 36, amend as shown:
Also, while the description illustrated various processes, it In Column 7, Line 29, amend as shown:
The operations of the network of an entity (e.g., a company, In Column 8, Line 46, amend as shown:
cloud service 302 to identify and remediate potential In Column 9, Line 21, amend as shown:
312 may also be able to predict other metrics such as In Column 9, Line 64, amend as shown:
assurance system 200 to operate in real-time and con- In Column 10, Line 39, amend as shown:
user experience and, consequently, potential issues before Signed and Sealed this  
Sixth Day of October, 2020

Andrei Iancu  
*Director of the United States Patent and Trademark Office*

In Column 12, Line 62, amend as shown:
which a given variable is received for analysis is too low, In Column 13, Line 34, amend as shown:
data sample reate, machine learning-based analyzer 312

In Column 14, Line 46, amend as shown:
402. For example, polling request 506 may specify any or In Column 15, Line 16, amend as shown:
334*a* on to data resampling engine 406 for further pro- In Column 15, Line 55, amend as shown:
machine learning-based model of analyzer In Column 17, Line 1, amend as shown:
transitory) computer-readable medium (e.g., disks/CDs/